United States Patent [19]

Oishi et al.

[11] Patent Number: 4,536,812
[45] Date of Patent: Aug. 20, 1985

[54] MAGNETIC DISK CARTRIDGE

[75] Inventors: Kengo Oishi; Osamu Suzuki, both of Odawara, Japan

[73] Assignee: Fuji Photo Film Co., Ltd., Kanagawa, Japan

[21] Appl. No.: 602,119

[22] Filed: Apr. 19, 1984

[30] Foreign Application Priority Data

Apr. 22, 1983 [JP] Japan .............................. 58-60449[U]

[51] Int. Cl.³ ...................... G11B 23/02; G11B 15/04; G11B 19/04
[52] U.S. Cl. ...................................... 360/133; 360/60; 242/199
[58] Field of Search .................... 360/132, 60, 133; 242/199–200

[56] References Cited

U.S. PATENT DOCUMENTS 4,041,537  8/1977  Kishi ................................. 360/60 X
4,320,421  3/1982  Carson et al. ................... 360/132 X
4,445,157  4/1984  Takahashi ......................... 360/133

Primary Examiner—John H. Wolff
Attorney, Agent, or Firm—Murray, Whisenhunt & Ferguson

[57] ABSTRACT

In a magnetic disk cartridge, a slide valve for prevention of erroneous erasure is slidably supported in a cartridge case having a detection hole adapted to be closed by the slide valve when the slide valve is at a predetermined sliding position. A resilient lock arm having projections at the ends is positioned on a side face of the slide valve integrally therewith. A pair of recess portions are positioned integrally with the case for receiving and retaining the projections of the lock arm, so that one of the projections is retained and stopped in one of the recess portions when the slide valve is at the sliding position for closing the detection hole the other projection is retained and stopped in the other recess portion when the slide valve is at the sliding position for opening the detection hole.

5 Claims, 3 Drawing Figures ized disk cartridge. This invention particularly relates to a magnetic disk cartridge comprising a small-diameter, very thin magnetic disk which is rotated at a high speed for recording and reproducing of image information or the like.

MAGNETIC DISK CARTRIDGE

BACKGROUND OF THE INVENTION

1. Field of the Invention

This invention relates to a magnetic disk cartridge. This invention particularly relates to a magnetic disk cartridge comprising a small-diameter, very thin magnetic disk which is rotated at a high speed for recording and reproducing of image information or the like.

2. Description of the Prior Art

Floppy disks are widely used as recording media for computers because they are easy to handle and low in cost. The floppy disk comprises a disk-like base made of a flexible polyester sheet or the like, and magnetic material layers overlaid on opposite surfaces of the disk-like base. The floppy disk is rotated at a high speed for magnetically recording information in the magnetic material layers by use of a magnetic head.

On the other hand, by utilizing the aforesaid advantages of the floppy disk and the advantage that a magnetic recording medium has over a silver halide photographic film in that the magnetic recording medium can be reused, it has been proposed to use a magnetic disk having a size smaller than the size of the floppy disk as an image recording medium in still cameras. The magnetic disk used for still cameras comprises a small-diameter, very thin magnetic recording medium, and a hub secured to the center of the magnetic recording medium. The magnetic disk is rotatably housed in a small, hard case provided at the center thereof with a hub hole for exposing the hub of the magnetic disk. The case also has magnetic head insertion apertures for exposing a part of the magnetic disk in the front surface and the rear surface of the case. The combination of the magnetic disk with the case is called a magnetic disk cartridge.

In the magnetic disk cartridge of the aforesaid type, it sometimes occurs that information stored in the magnetic recording medium is erased by an erroneous operation of the recording and reproducing apparatus. Therefore, it is desired to provide the magnetic disk cartridge with a means for preventing such erroneous erasure. For this purpose, there has heretofore been used a lug which is fabricated integrally with the case of the magnetic disk cartridge and which is broken by the user when necessary to prevent erroneous erasure. In this method, however, when information has to be recorded in the magnetic recording medium of the magnetic disk cartridge after the lug of the magnetic disk cartridge is broken, it is necessary to conduct a troublesome operation such as closing of the lug hole with cellophane adhesive tape. As a means for preventing erroneous erasure, which makes it possible to easily restore the magnetic disk cartridge to the condition in which recording is possible after it has once been put in the condition to prevent erroneous erasure, it has been proposed to employ a plug for insertion into and ejection from the case. However, the magnetic disk cartridge of the type used in a still camera is loaded into a camera body having approximately the same size as that of a 35 mm camera. Thus the magnetic disk cartridge is fabricated to have a very small size and a very small thickness. Therefore, when the aforesaid plug is used for preventing erroneous erasure, the magnetic disk cartridge becomes very difficult to operate since, for example, a small, special pin is required to insert and eject the plug.

FIG. 1 shows another conventional means for preventing erroneous erasure. A slide valve 2 is slidably supported in a case 1, and a detection hole (not shown) closed by the slide valve 2 when the slide valve 2 comes to a predetermined sliding position is positioned in one part of the case 1. A lock arm 2a is fabricated integrally with one side face of the body of the slide valve 2 so that the lock arm 2a can be resiliently deformed approximately in parallel to the body of the slide valve 2. A projection 2b is positioned at one end of the lock arm 2a, and recess portions 1a and 1b for receiving the projection 2b are positioned integrally with the case 1. When the slide valve 2 is moved to the position for closing the detection hole or to the position for opening the detection hole, the projection 2b is supported and stopped in one of the recess portions 1a and 1b. The engagement means constructed as described above operates smoothly at the time the projection 2b of the resilient lock arm 2a is pulled and disengaged from the recess portion 1a or 1b. However, at the time the projection 2b is fitted into the recess portion 1a or 1b, the lock arm 2a supporting the projection 2b is liable to be deformed or broken, and the engagement means does not operate smoothly.

SUMMARY OF THE INVENTION

The primary object of the present invention is to provide a magnetic disk cartridge having a very small size and a very small thickness and comprising an erroneous erasure prevention means which can be readily put into the condition for preventing erroneous erasure.

Another object of the present invention is to provide a magnetic disk cartridge having a very small size and a very small thickness and comprising an erroneous erasure prevention means which can be readily returned to the condition for enabling recording.

The present invention provides a magnetic disk cartridge having a case and a magnetic disk rotatably housed in the case, the magnetic disk cartridge comprising:

(i) a slide valve for prevention of erroneous erasure, which is supported in said case in a manner slidable in the direction normal to the thickness of said magnetic disk, (ii) a detection hole positioned at one part of said case, said detection hole being closed by said slide valve when said slide valve is positioned at a predetermined sliding position, and (iii) an engagement means comprising a lock arm which is positioned on a side face of said slide valve integrally therewith extending in parallel therewith and which exhibits resiliency in the direction normal to the body of said slide valve, a pair of projections positioned one at either end of said lock arm, and a pair of recess portions positioned integrally with said case for receiving and retaining said projections of said lock arm, whereby one of said pair of projections is retained and stopped in one of said pair of recess portions when said slide valve is at the sliding position for closing said detection hole and the other of said pair of projections is retained and stopped in the other of said recess portions when said slide valve is at the sliding position for opening said detection hole.

The magnetic disk cartridge of the present invention has a small and thin shape, and still can be readily put to the erroneous erasure prevention condition. Further, the magnetic disk cartridge can be readily returned to the recording condition. Thus the magnetic disk cartridge of the present invention is easy to operate and advantageous in practical use.

By operating the slide valve, for example, from a window for exposing a surface of the slide valve, it is possible to optionally put the slide valve into the condition closing the detection hole of the case or into the condition opening the detection hole. By detecting the condition of the slide valve by use of a mechanical means or an optical means conventionally employed in recording and reproducing apparatuses, it is possible to put the recording and reproducing apparatus into the condition wherein recording and erasure are possible or into the condition wherein recording and erasure are impossible.

DESCRIPTION OF THE PREFERRED EMBODIMENTS

The present invention will hereinbelow be described in further detail with reference to the accompanying drawings.

Figure 1:
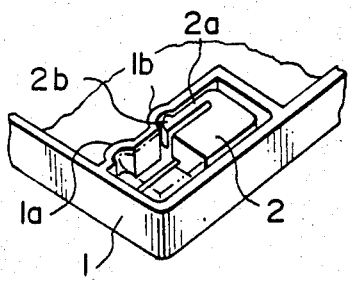
FIG. 1 is a partial perspective view showing the internal configuration of the conventional magnetic disk cartridge.
Figure 2:
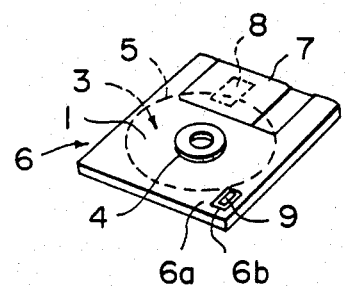
FIG. 2 is a perspective view showing an embodiment of the magnetic disk cartridge in accordance with the present invention.

Referring to FIG. 2, the magnetic disk cartridge in accordance with the present invention comprises a magnetic disk 5 and a thin case 6 having a rectangular parallelepiped shape for rotatably housing the magnetic disk 5 therein. The magnetic disk 5 consists of a thin, flexible disk-like magnetic recording medium 3 and a hub 4 secured to the center of the magnetic recording medium 3. The magnetic recording medium 3 comprises a very thin base, e.g., a polyester sheet having a thickness of 50μ or less, and magnetic material layers overlaid on opposite surfaces of the base by coating, deposition, sputtering, or the like. The case 6 is provided in the upper and lower surfaces with magnetic head insertion apertures 8 for exposing a part of the magnetic recording medium 3 of the magnetic disk 5 to the outside of the case 6. The magnetic head insertion apertures 8 are opened and closed by a shutter 7. (In FIG. 2, only the upper magnetic head insertion aperture 8 and the upper side face of the shutter 7 are shown.) The shutter 7 is urged, for example, by an urging means positioned in the case 6, to close the magnetic head insertion apertures 8. The shutter 7 is also connected to a link member which comes into contact with a contact portion of the recording and reproducing apparatus such as a still camera when the magnetic disk cartridge is loaded into the apparatus. As the contact portion of the recording and reproducing apparatus is moved, the link member is moved by the contact portion and, consequently, the shutter 7 is pulled by the link member to open the magnetic head insertion apertures 8. When the magnetic head insertion apertures 8 are opened, it becomes possible for the magnetic head of the recording and reproducing apparatus to access the magnetic recording medium 3. The magnetic disk 5 is rotated at high speeds by a rotation shaft of the recording and reproducing apparatus, which is engaged with the hub 4 of the magnetic disk 5. Thus information is recorded in the magnetic disk 5 or reproduced therefrom by use of the magnetic head.

Since the magnetic disk 5 is housed in the case 6 having the rectangular parallelepiped shape, spaces are left at corner portions of the case 6. In the space at one corner portion 6a of the case 6, a slide valve 9 is supported for sliding in a direction approximately normal to thickness of the magnetic disk 5. In the upper surface of the case 6 at the corner portion 6a is positioned a window section 6b for exposing a part of the slide valve 9 within the sliding range of the slide valve 9.

Figure 3:
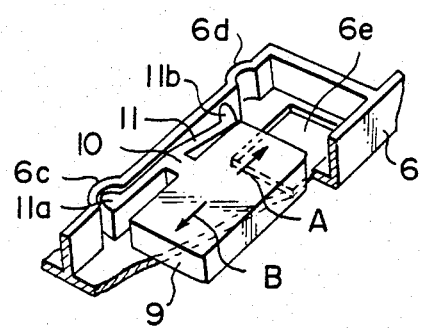
FIG. 3 is a partially sectional perspective view showing the internal configuration of the magnetic disk cartridge of FIG. 2.

FIG. 3 shows the internal configuration of the portion near the slide valve 9 in the magnetic disk cartridge. The slide valve 9 is made, for example, of a resilient plastic material. A lock arm 11 is positioned integrally with a side face of the slide valve 9 via a supporting section 10. The lock arm 11 has a pair of projections 11a and 11b, one positioned at either end thereof. The projections 11a and 11b are convex outwardly of the slide valve 9.

In the case 6 supporting the slide valve 9 are positioned a first recess portion 6c and a second recess portion 6d in spaced relation to each other in the sliding direction of the slide valve. The first recess portion 6c receives only the projection 11a of the lock arm 11, and the second recess portion 6d receives only the projection 11b of the lock arm 11. Further, a detection hole 6e is formed in the lower surface of the case 6 so that the detection hole 6e is closed by the slide valve 9 at one end of its sliding motion.

As shown in FIG. 3, when the projection 11a of the slide valve 9 is received in the first recess 6c, the window section 6b and the detection hole 6e of the case 6 are not closed by the slide valve 9 but are opened to communicate with each other. In this condition, when the slide valve 9 exposed at the window section 6b is operated, for example manually, to move the slide valve 9 in the direction as indicated by the arrow A, the portion of the lock arm 11 in the vicinity of the projection 11a is resiliently deflected towards the body of the slide valve 9, and the projection 11a is disengaged from the first recess portion 6c. When the slide valve 9 is further moved in the direction as indicated by the arrow A, the projection 11b becomes resiliently engaged with the second recess portion 6d and held therein. Thus the slide valve 9 is maintained in the condition stopped at that position. Since the projections 11a and 11b receive only pulling force, there is no risk of excessive force being applied to the lock arm 11, and reliability of the operation is improved.

When the slide valve 9 is stopped as described above, the window section 6b and the detection hole 6e of the case 6 are closed by a part of the slide valve 9. Then, when the slide valve 9 is moved reversely as indicated by the arrow B, the slide valve 9 is returned to the condition as shown in FIG. 3.

As described above, by moving the slide valve 9 according to the instructions as indicated by the arrows A and B exposed through the window section 6b, it is possible to put the slide valve 9 into the condition wherein the window section 6b and the detection hole 6e of the case 6 are closed or into the condition wherein the window section 6b and the detection hole 6e are opened to communicate with each other. Though the slide valve 9 is formed in a thin shape, the size can be made sufficiently large by utilizing the space at the corner portion 6a of the case 6. Therefore, it is easy to move the slide valve 9.

By providing the recording and reproducing apparatus with a detection rod which is sufficiently inserted into the case 6 through the window section 6b or the detection hole 6e when the window section 6b and the detection hole 6e are opened, and which is prevented by the slide valve 9 from entering the case 6 when the window section 6b and the detection hole 6e are closed by the slide valve 9, it becomes possible to detect the open and closed conditions of the window section 6b and the detection hole 6e by use of the detection rod. The condition wherein the window section 6b and the detection hole 6e are open is defined, for example, as the erroneous erasure prevention condition. In this case, when the erroneous erasure prevention condition is detected by the detection rod, the recording and reproducing apparatus is mechanically or electrically put into the condition wherein recording and erasure are impossible. Thus it is possible to prevent the information stored in the magnetic disk cartridge from being erased by mistake.

The method of using the detection rod as described above for detecting the erroneous erasure prevention condition has heretofore been known. It is also possible to provide the recording and reproducing apparatus with a conventional optical detector comprising a light projector, for emitting light through the window section 6b and the detection hole 6e, and a light receiver, thereby detecting the open and closed conditions of the window section 6b and the detection hole 6e. In order to employ the optical detector of this type, it is necessary to provide both of the window section 6b and the detection hole 6e as described above. When a mechanical detector as described above is employed, it is possible to provide only the detection hole 6e. However, provision of the window section 6b and the detection hole 6e as described above is advantageous from the viewpoint of enlargement of the range of application of the magnetic disk cartridge and simplification of the mechanical detector.

We claim:

1. A magnetic disk cartridge having a case and a magnetic disk rotatably housed in the case, the magnetic disk cartridge comprising:
   (i) a slide valve for prevention of erroneous erasure, which is supported in said case in a manner slidable in the direction normal to the thickness of said magnetic disk,
   (ii) a detection hole positioned at one part of said case, said detection hole being closed by said slide valve when said slide valve is positioned at a predetermined sliding position, and
   (iii) an engagement means comprising a lock arm which is positioned on a side face of said slide valve integrally therewith extending in parallel therewith and which exhibits resiliency in the direction normal to the body of said slide valve, a pair of projections positioned one at either end of said lock arm, and a pair of recess portions positioned integrally with said case for receiving and retaining said projections of said lock arm, whereby one of said pair of projections is retained and stopped in one of said pair of recess portions when said slide valve is at the sliding position for closing said detection hole and the other of said pair of projections is retained and stopped in the other of said recess portions when said slide valve is at the sliding position for opening said detection hole.

2. A magnetic disk cartridge as defined in claim 1 wherein said case has a rectangular parallelepiped shape, and said slide valve is positioned in a corner portion of said case.

3. A magnetic disk cartridge as defined in claim 1 wherein said case is also provided with a window section for exposing a part of said slide valve on the side of said case opposite to said detection hole, so that said window section and said detection hole are simultaneously opened and closed by said slide valve.

4. A magnetic disk cartridge as defined in claim 1 wherein said slide valve is made of a resilient material.

5. A magnetic disk cartridge having a case and a magnetic disk rotatably housed in the case, the magnetic disk cartridge comprising:
   a slide valve for prevention of erroneous erasure, which is supported in said case in a manner slidable in the direction normal to the thickness of said magnetic disk;
   a detection hole positioned at one part of said case, said detection hole being closed by said slide valve when said slide valve is positioned at a predetermined sliding position; and
   an engagement means comprising a lock arm which is positioned on a side face of said slide valve integrally therewith extending in parallel therewith and which exhibits resiliency in a direction normal to the body of said slide valve, a pair of projections positioned one at either end of said lock arm, and a pair of recess portions positioned integrally with said case for receiving and retaining said properties of said lock arm, both of said projections projecting in the same direction away from said slide valve and generally towards said recess portions one of said pair of projections being retained and stopped in one of said pair of recess portions when said slide valve is at the sliding position for closing said detection hole, and the other of said pair of projections being retained and stopped in the other of said recess portions when said slide valve is at the sliding position for opening said detection hole.

* * * * *